(12) United States Patent
Saliba (10) Patent No.: US 6,937,435 B2
(45) Date of Patent: Aug. 30, 2005

(54) TAPE HEAD WITH THIN SUPPORT SURFACE AND METHOD OF MANUFACTURE

(75) Inventor: George Saliba, Northborough, MA (US)

(73) Assignee: Quantum Corporation, San Jose, CA (US)

( * ) Notice: Subject to any disclaimer, the term of this patent is extended or adjusted under 35 U.S.C. 154(b) by 137 days.

(21) Appl. No.: 10/439,978

(22) Filed: May 16, 2003

(65) Prior Publication Data

US 2004/0228029 A1 Nov. 18, 2004

(51) Int. Cl.[7] .............................................. G11B 5/187
(52) U.S. Cl. ...................... 360/122; 360/121; 360/221; 29/603.12
(58) Field of Search .................. 360/122, 121, 360/125, 126, 221; 29/603.12, 603.11, 603.07, 603.16, 603.19; 451/57, 28

(56) References Cited

U.S. PATENT DOCUMENTS

| | | | |
|---|---|---|---|
| 3,663,765 A | 5/1972 | Schneider | |
| 3,665,436 A | 5/1972 | Murray et al. | |
| 3,947,887 A | * 3/1976 | Platter ........................ | 360/221 |
| 3,961,372 A | 6/1976 | Brock et al. | |
| 4,251,841 A | 2/1981 | Jacobs | |
| 4,300,179 A | 11/1981 | Barnes et al. | |
| 4,418,473 A | 12/1983 | Burkhart et al. | |
| 4,430,440 A | 2/1984 | Wada et al. | |
| 4,649,448 A | 3/1987 | Nakajima | |
| 4,650,774 A | 3/1987 | Kawaguchi et al. | |
| 4,686,596 A | 8/1987 | Kraemer et al. | |
| 4,695,909 A | 9/1987 | Momata et al. | |
| 4,709,284 A | 11/1987 | Endo et al. | |
| 4,814,915 A | 3/1989 | Wada et al. | |
| 4,835,640 A | 5/1989 | Endo et al. | |

(Continued)

FOREIGN PATENT DOCUMENTS

| | | | |
|---|---|---|---|
| EP | 0 437 147 | 7/1991 | |
| EP | 0 439 943 | 8/1991 | |
| EP | 0 469 618 | 2/1992 | |
| EP | 0 550 890 | 7/1993 | |
| EP | 0 590 701 | 4/1994 | |
| EP | 0 710 392 | 5/1996 | |
| JP | 62-259208 | 11/1987 | |
| JP | 63-231707 | 9/1988 | |
| JP | 3141015 | 6/1991 | |
| WO | WO 81/00780 | 3/1981 | |
| WO | WO 89/06420 | 7/1989 | |
| WO | WO 8906425 A1 * | 7/1989 | ........... G11B/15/62 |
| WO | WO 95/03606 | 2/1995 | |

OTHER PUBLICATIONS

IBM (1976). "Magnetic Head Construction," *IBM Tech. Discl. Bulletin*, 19(2):397.

*Primary Examiner*—William J Klimowicz
(74) *Attorney, Agent, or Firm*—Morrison & Foerster LLP (57) ABSTRACT

According to one aspect, an exemplary method of manufacturing a magnetic head assembly with a predetermined wrap angle is described. The method includes removing a portion of a magnetic head support surface to create a slot transverse to a direction the media advances and at least partially separating a major support surface having an active device region and a thin support surface. The method further includes removing a portion of the thin support surface such that the height of at least a portion of the thin support surface is reduced relative to the major support surface. The height may be reduced to achieve a predetermined wrap angle between the media and the major support surface of the head assembly.

12 Claims, 6 Drawing Sheets

U.S. PATENT DOCUMENTS

| | | | |
|---|---|---|---|
| 4,868,697 A | | 9/1989 | McClure |
| 4,875,129 A | * 10/1989 | Favrou et al. ............... 360/122 |
| 4,888,657 A | * 12/1989 | Lacey et al. ................ 360/122 |
| 4,949,208 A | | 8/1990 | Milo et al. |
| 5,008,767 A | | 4/1991 | Iwata et al. |
| 5,034,838 A | * 7/1991 | Brock et al. ................ 360/122 |
| 5,049,454 A | | 9/1991 | Johnson et al. |
| 5,055,959 A | | 10/1991 | Saliba |
| 5,065,500 A | | 11/1991 | Yoneda et al. |
| 5,136,775 A | | 8/1992 | Onoe et al. |
| 5,161,299 A | | 11/1992 | Denison et al. |
| 5,426,551 A | | 6/1995 | Saliba |
| 5,436,780 A | | 7/1995 | Nagata et al. |
| 5,469,313 A | | 11/1995 | Isozaki et al. |
| 5,475,553 A | | 12/1995 | Saliba |
| 5,574,606 A | | 11/1996 | Kimura |
| 5,602,704 A | | 2/1997 | Gooch et al. |
| 5,663,856 A | | 9/1997 | Packard |
| 5,737,152 A | | 4/1998 | Balakrishman |
| 5,737,158 A | | 4/1998 | Tanaka et al. |
| 5,751,527 A | | 5/1998 | Sundaram et al. |
| 5,754,369 A | | 5/1998 | Balakrishman |
| 5,771,142 A | | 6/1998 | Maurice et al. |
| 5,862,014 A | | 1/1999 | Nute |
| 5,883,770 A | | 3/1999 | Biskeborn et al. |
| 5,905,613 A | | 5/1999 | Biskeborn et al. |
| 5,953,184 A | | 9/1999 | Barber et al. |
| 5,963,401 A | | 10/1999 | Dee et al. |
| 5,969,912 A | | 10/1999 | Cope |
| 6,040,964 A | | 3/2000 | Saliba |
| 6,188,532 B1 | | 2/2001 | Albrecht et al. |
| 6,282,055 B1 | | 8/2001 | Lakshmikumaran et al. |
| 6,369,982 B2 | | 4/2002 | Saliba |
| 6,424,499 B1 | | 7/2002 | Balakrishman et al. |
| 6,469,867 B2 | | 10/2002 | Saliba |
| 6,577,470 B1 | | 6/2003 | Rumpler |
| 6,587,305 B2 | | 7/2003 | Saliba |
| 6,606,219 B2 | | 8/2003 | Lam |
| 6,611,398 B1 | | 8/2003 | Rumpler et al. |
| 2002/0141112 A1 | | 10/2002 | Saliba |
| 2003/0076631 A1 | | 4/2003 | Torline et al. |
| 2003/0214745 A1 | | 11/2003 | Lau |

* cited by examiner

TAPE HEAD WITH THIN SUPPORT SURFACE AND METHOD OF MANUFACTURE

BACKGROUND OF THE INVENTION

1. Field of the Invention

The present invention relates generally to magnetic tape read and/or write heads, and more particularly to magnetic tape read and/or write heads with a slot formed on a supporting surface of the head.

2. Description of the Related Art

Magnetic tape continues to be an efficient and effective medium for data storage in computer systems. Increased data storage capacity and retrieval performance is desired of all commercially viable mass storage devices and media. In the case of linear tape recording, a popular trend is toward multi head, multi-channel fixed head structures with narrowed recording gaps and data track widths so that many linear data tracks may be achieved on a tape medium of a predetermined width, such as one-half inch width tape. To increase the storage density and reduce access time of magnetic tapes, data tracks on the tape are arranged with greater density and the tape is streamed by a tape head at increasingly faster rates.

Magnetic tape heads typically include an active device region including raised strips or ridges, commonly referred to as islands, that provide a raised tape support or wear surface with embedded transducers across which the magnetic tape advances. These embedded transducers can be either a recording element for writing information onto a magnetic tape or a reproducing element for reading information off a magnetic tape. An embedded recording element produces a magnetic field in the vicinity of a small gap in the core of the element, which causes information to be stored on magnetic tape as it moves across the support surface. In contrast, a reproducing element detects a magnetic field from the surface of magnetic tape as the tape moves over the support surface.

Generally there is a microscopic separation between an active device region of the tape head, including recording and reproducing elements, and the tape during operation that reduces the strength of the magnetic field coupled to the tape surface during the recording process. During the recording or reproducing process, the small separation reduces the coupling between the tape field and the reproducing element, causing a signal loss. This reduction in magnetic field strength is generally referred to as a "spacing loss." The magnetic field strength detected by a tape or a reproducing element is proportional to $e^{-kd/\lambda}$, where d is the head-to-tape separation, $\lambda$ is the recording wavelength, and k is a constant. The detected magnetic field strength decreases exponentially both with respect to separation between the tape and the support surface and with respect to recording density (which is inversely related to the recording wavelength). Thus, while a limited amount of head-to-tape separation might be acceptable at low recording densities (100–200 KFCI), smaller transducers used with magnetic tapes of higher recording densities (over 200 KFCI) can tolerate little to no head-to-tape separation.

Further, to allow for faster access and write times, the media may be advanced by a head at speeds ranging from 100 to 1,000 inches per second or more. Increased media speed, however, may entrap air between a support surface of the tape head and the tape. The air may cause increased separation between the magnetic tape and the support surface leading to signal loss and/or excessive tape damage.

The amount of head-to-tape separation may be reduced by ensuring a proper wrap angle of the tape around the head structure to create tension in the tape and reduce the amount of air that may become entrapped. Typical wrap angles may range between about 0.1 and 5 degrees between the advancing tape and the supporting surface of the head structure depending on the particular application. If the wrap angle is too large, a bubble or arc may occur, creating a separation between the tape and the head structure. Further, if the wrap angle is too small the tape may entrap air as it advances over the head structure and increases the separation therebetween. Accordingly, high-speed tape drive systems are generally designed with precise tape paths and contoured tape heads to achieve a desired wrap angle. Manufacturing contoured tape heads with desired wrap angles is generally costly and complicated.

Additionally, increased tension and pressure to prevent spacing has several deleterious consequences. For example, increased tension and pressure may reduce tape life and increase the possibility of tape damage and data loss. Tape damage may lead to increased lateral tape motion and decreased reliability. Also, increased tension and pressure may cause the head structure to wear down more quickly resulting in shortened head life.

What is needed is a read/write head structure that presents an appropriate wrap angle to the magnetic tape to decrease spacing loss between the head structure and the magnetic tape. Further, a head structure with reduced manufacturing complexity and cost is needed.

BRIEF SUMMARY OF THE INVENTION

In one aspect, an exemplary method of manufacturing a magnetic head assembly with a predetermined wrap angle is described. The method includes removing a portion of a magnetic head support surface to create a slot transverse to a direction the media advances and at least partially separating a major support surface having an active device region and a thin support surface. The method further includes removing a portion of the thin support surface such that the height of at least a portion of the thin support surface is reduced relative to the major support surface. The height may be reduced to achieve the predetermined wrap angle between the media and the major support surface of the head assembly.

In another aspect, an exemplary magnetic head assembly for writing and/or reading from a magnetic recording media is described. The head assembly may include a major support surface for contacting and supporting the media; the major support surface including a width measured along a direction the media is advanced. One or more active device regions may be positioned within the major support surface and may include sets of read and/or write transducers. The head assembly further includes a thin support surface having a width measured along the direction the media is advanced. The major support surface and thin support surface are at least partially separated by a slot extending transversely to the direction the media is advanced and the width of the thin support surface is selected to effect a predetermined wear of the thin support surface.

The present invention and its various embodiments are better understood upon consideration of the detailed description below in conjunction with the accompanying drawings and claims.

DETAILED DESCRIPTION OF THE INVENTION

The following description is presented to enable any person skilled in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

In one aspect, an exemplary magnetic head assembly may provide enhanced airflow control and reduced tape damage by controlling the wrap angle between the magnetic tape and the magnetic head structure. The exemplary magnetic head design includes a slot formed near the leading and/or trailing edge of the head structure creating a relatively thin support surface or bar at the edge of a larger or major support surface of the head structure that includes an active device region. The relatively thin support surface, slot, and major support surface are intended to create a desired wrap angle between the tape and the major support surface to improve airflow and reduce spacing losses between the tape and the head structure for improved device performance. As the tape passes over the head structure, the thin support surfaces adjacent the slots are worn down at a faster rate depending, at least in part, on the width of the thin support surfaces to create the predetermined wrap angle. The exemplary head assembly may further include relatively thin support surfaces formed parallel to the direction of tape advancement and separated from the main support surface by a slot allowing the tape head to move transversely across the tape at a desired wrap angle with reduced potential for spacing loss, tape damage, or lateral tape motion.

The exemplary head assembly may be manufactured at reduced cost and complexity and with greater tolerances than conventional contoured head structures. For example, conventional contoured head structures are generally manufactured with complex contours to create precise wrap angles within desired tolerances. The complexity to create a conventional countered head structure with a desired wrap angle comes at a significant cost. In contrast, an exemplary head structure as described below, which may include flat or contoured support surfaces, may be advantageously manufactured to create a desired wrap angle by forming a slot in the head assembly at a desired location and width. The thin support surface may then be worn down by a lapping tape or magnetic tape to a desired height. The tolerances of such a slot to create a desired wrap angle are generally greater than convention contoured heads.

The wear on a support surface of the head structure is generally proportional to the pressure of the tape on the surface of the head. The pressure generally depends, at least in part, on the tension in the tape, the wrap angle, and the width of the support surfaces. By positioning the slot to create a thin leading/trailing edge support surface, a lapping tape or the like will wear down the thin support surface at a faster rate than the wider main support surface because of the higher wrap angle and thinner width of the thin support surface. The thin support surface and slot widths may therefore be designed so that the thin support surface recesses to a particular height with use and creates a predetermined or desired wrap angle with the major support surface. In this manner a desired wrap angle may be achieved by forming a slot in the head structure and without the manufacturing complexity or cost of conventional contoured head structures.

Exemplary head assemblies are described in greater detail below. The examples are described as being particularly useful as part of a linear tape head assembly for use in a magnetic tape head assembly with transducer elements that may include suitable cores, such as ferrite cores. Those skilled in the art, however, will understand that the transducer element or core may be a core inductive head, a magneto resistive read element, a thin film gap head, and other types of transducer elements in which it is useful to provide desired wrap angles to protect and improve airflow by managing spacing losses, lateral tape motion, and the like. Additionally, the magnetic media discussed is magnetic recording tape, however, the exemplary heads described and illustrated may be useful with other media such as optical recording tape, contact hard disks, floppy disks, and the like.

Figure 1A:
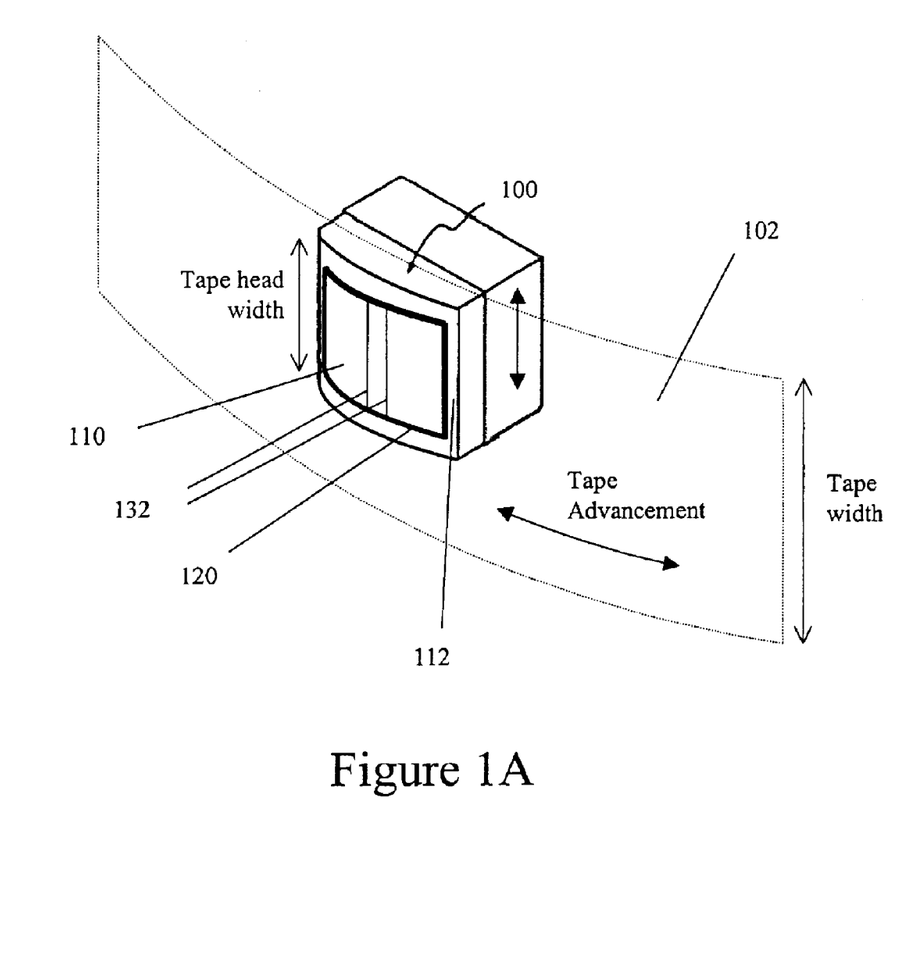
FIG. 1A illustrates a perspective view of an exemplary head structure.
Figure 1B:
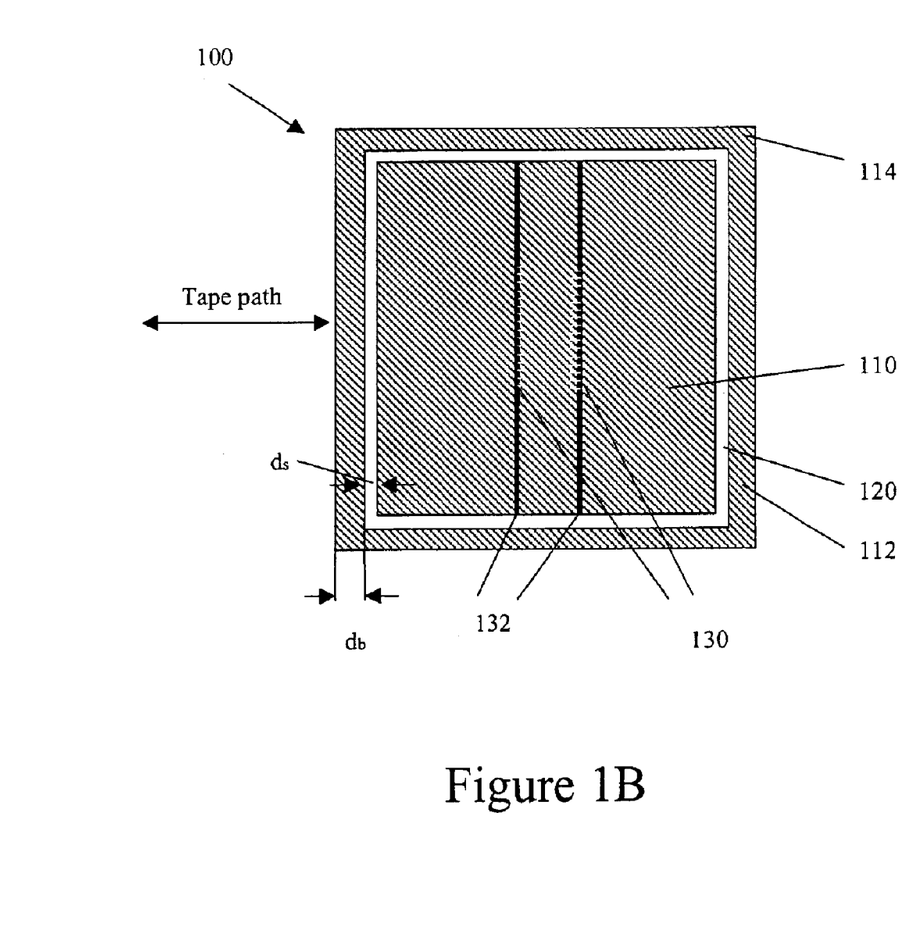
FIG. 1B illustrates a plan view of an exemplary head structure.

FIGS. 1A and 1B illustrate a perspective and plan view respectively of an exemplary magnetic tape head including a trench region or slot 120 formed on support surface 110. Support surface 110 of magnetic tape head 100 may include one or more active device regions 130 along bond line 132. Active device regions 130 may include, for example, a column of 16 write transducers and a column of 16 read transducers. An exemplary magnetic tape 102 is illustrated in outline in FIG. 1A advancing across the support surface 110 of magnetic tape head 100. In this instance, the head 100 width is less than that of the tape 102. Further, arrows shown on tape 102 indicate the reversible direction of tape 102 movement relative to magnetic tape head 100.

Arrows shown on magnetic tape head 100 indicate that the magnetic tape head 100 may be capable of moving back and forth, or up and down as shown in FIG. 1A, traversing the width of tape 102 in a direction generally orthogonal to the direction of tape 102 advancement. The movement of magnetic tape head 100 allows the head 100 to align the read and/or write transducers in the active regions 130 to read and/or write information along one or more different data tracks arranged longitudinally along tape 102.

Tension applied to tape 102 as the tape advances across head 100 causes tape 102 to exert a pressure against the support surface 110 (within boundries formed by slot 120) and support surface 112 that is generally uniform along the direction transverse to the direction of tape 102 advancement. This uniform pressure is generally proportional to the tension and the wrap angle and inversely proportional to the width of the support surfaces 110 and 112.

The pressure may be changed, for example, by modifying the tension in the tape, by modifying the wrap angle of the tape with the support surface, or by modifying the width (along the tape path) of the support surface. In particular, the pressure on the surface is generally increased by increasing the tension in the tape, by increasing the wrap angle of the tape on the support surface, or by decreasing the width of the support surface. Generally, increased pressure between the tape and the support surface reduces "spacing loss," and increase the reliability of the read/write head.

Magnetic head 100 includes a trench or slot 120 formed around a central support surface 110 of magnetic head 100 structure that faces or creates a supporting surface for a magnetic tape. Adjacent slot 120 is a bar or thin support surface 112. As tape passes across support surface 110 of magnetic head 100 a wrap angle of the magnetic tape with respect to the surface of magnetic head 100 is created to increase the pressure and diminish the potential for spacing loss between the tape and the active device regions 130 of support surface 110. The wrap angle may be varied by altering the ratio of widths along the direction of tape advancement of slot 120 and second support surface 112. In particular the wrap angle, e.g., the angle at which the face of the major support surface 110 of magnetic head 100 and magnetic tape 102 interact, may be varied by varying the width of support surface 112 and the width of slot 120. The width of support surface 112 will vary the pressure on the exposed surface of the support surface 112 from the magnetic tape as it passes across. To create a desired wrap angle, the surface of support surface 112 may be worn down to a particular height depending, at least in part, on the pressure and material of support surface 112. Therefore, a wrap angle may be preselected or predetermined by forming slot 120 to create a ratio of slot 120 width to support surface 112 width to achieve a desired wrap angle.

Additionally, the degree at which support surface 112 is depressed during use or lapping may also depend on the particular material used. For example, more wear resistant materials may require a smaller width support surface 112 to create a desired wrap angle than less resistant materials. Exemplary materials include AlTiC, Zirconia, CaTi, or ferrite materials, or the like. Further, support surface 110 and support surface 112 may include different materials having different wear characteristics to achieve a desired wrap angle. For example, support surface 112 may include materials having more or less wear resistance than materials included in support surface 110.

Preferably, the wrap angle is chosen to reduce or eliminate the airflow between the magnetic tape and magnetic head 100 to minimize separation between the head 100 and tape as well as reduce damage to the tape. For example, at too great of a wrap angle a bubble of air may form between magnetic head 100 and the magnetic tape. Further, at high tape speeds and low wrap angles air may be pulled under the tape between the magnetic head 100 and the magnetic tape. Generally, varying the ratio of the slot width $d_s$ to the support surface width $d_b$ may control the wrap angle. For example, the wrap angle may be increased by increasing the slot width of slot 120 in relation to support surface 112, and decreased by decreasing the width of the slot 120 in relation to support surface 112. Also, by reducing the width of support surface 112 wear increases and the wrap angle increases, and by increasing width of support surface 112, the wear decreases and the wrap angle decreases.

In one example, the slot width $d_s$ may be approximately 3–5 millinches wide and the support surface width $d_b$ approximately 2–3 millinches. In another example, the ratio of slot width $d_s$ to support surface width $d_b$ is between approximately 1 and 3. Depending on the particular application and desired wrap angle, however, other widths and ratios are contemplated for both the slot width $d_s$ and the support surface width $d_b$.

Exemplary tape head 100 is preferably smaller in width than tape 102 measured transversely to the direction of tape advancement as indicated in FIG. 1A. For example, tape head 100 may be between 20 to 200 milli-inches in width, but larger or smaller tape heads are possible and contemplated. As tape head 100 moves transversely to the direction of tape advancement the slot 120 formed adjacent the top and bottom edges of supporting surface 110 and the top and bottom portion of support surface 112 create an appropriate wrap angle thereto to move, for example, without damaging tape 102 or creating spacing loss. In some examples, head 100 may include an additional support surface, e.g., a support bar included with the head assembly (see FIG. 4) to add further support to the tape as it advances by head 100.

The support surfaces 112 on the leading and trailing edge may be worn down to a lesser or greater degree than those support surfaces 112 positioned parallel to the direction of tape advancement. In general, the desired wrap angle as the head moves transversely across the tape is designed to reduce tape damage and lateral tape motion and therefore may be designed with a similar or different wrap angle depending on the particular application.

In this example, slot 120 is formed similarly in a perimeter around the read/write elements 130. This allows magnetic head 100 to be tolerant in all dimensions, i.e., have an appropriate wrap angle as the tape advances and as the head moves transversely to the tape path. Further, in one example, the corners 114 of head 100 may be recessed relative to other portions of support surface 112. This allows the head 100 to move transversely relative to the direction of tape advancement with reduced likelihood of damage to the tape from sharp edges of the generally square or rectangular head 100.

Figure 2A:
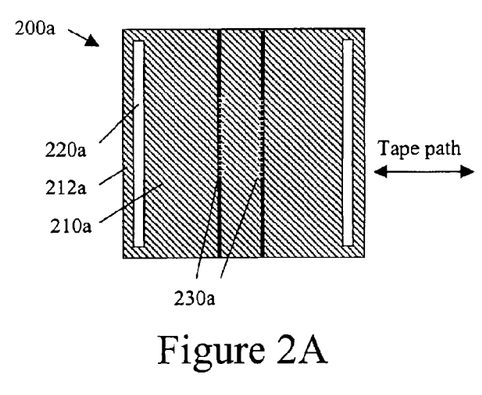
FIGS. 2A–2D illustrate plan views of various exemplary head structures.

FIGS. 2A–2D illustrate various top views of exemplary magnetic head structures. FIG. 2A illustrates an exemplary head structure 200a having slots 220a formed between a main support surface 210a and thin support surface 212a. Exemplary head structure 200a is similar to that of FIG. 1B, except that head structure 200a does not include slots formed parallel to the tape path.

Figure 2B:
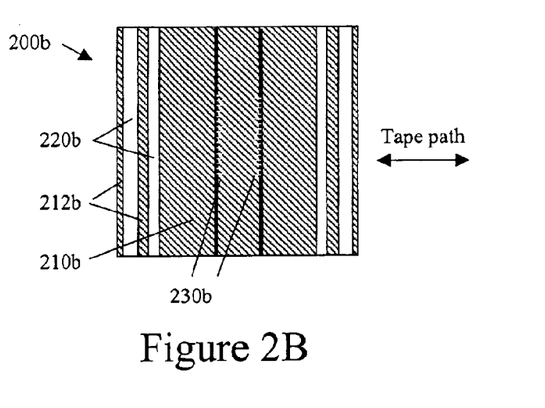

FIG. 2B illustrates an exemplary head structure 200b including multiple slot 220b formed transversely to the tape path. In this instance, two or more slots 200b are included to create the desired wrap angle to the tape. In this example, the outside slot 220b may be made slightly wider and/or the outside support 212b made slightly more narrow than the inside slot 220b and support 212b to create a more gentle wrap angle to head 200b. One or more slots may also be included parallel to the tape path as illustrated in FIG. 1B to provide a desired wrap angle to the top and bottom portion of head structure 200b during transverse movement of head 200b.

Figure 2C:
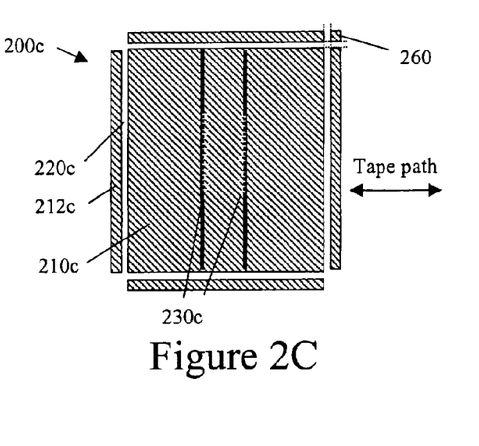

FIG. 2C illustrates an exemplary head structure 200c wherein slots 220c have been formed to extend along the full surface of head structure 200c as indicated by the dotted lines. Forming slots 220c in this manner isolates and allows for the removal or recess of corner portion 260 of head structure 200c after a lapping process or the like. Removal of the corner portion 260 reduces the potential for damage from the relatively sharp edge to the tape during lateral movement of the head structure 200c with respect to the tape.

Figure 2D:
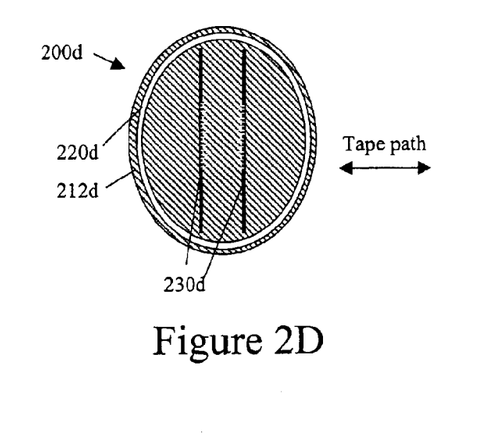

FIG. 2D illustrates an exemplary head structure 200d formed in a non-rectangular shape. In this example, head structure 200d is formed, e.g., by laser etching, as an ellipse shape with an ellipse shaped slot 220d and thin support surface 212d. It should be recognized that various other shapes are contemplated, such as a circle, a square with rounded corners, a polygon, and the like. Additionally, the shape of head structure 200d may be different from the shape of slot 220d and support surface 212d.

Figure 3A:
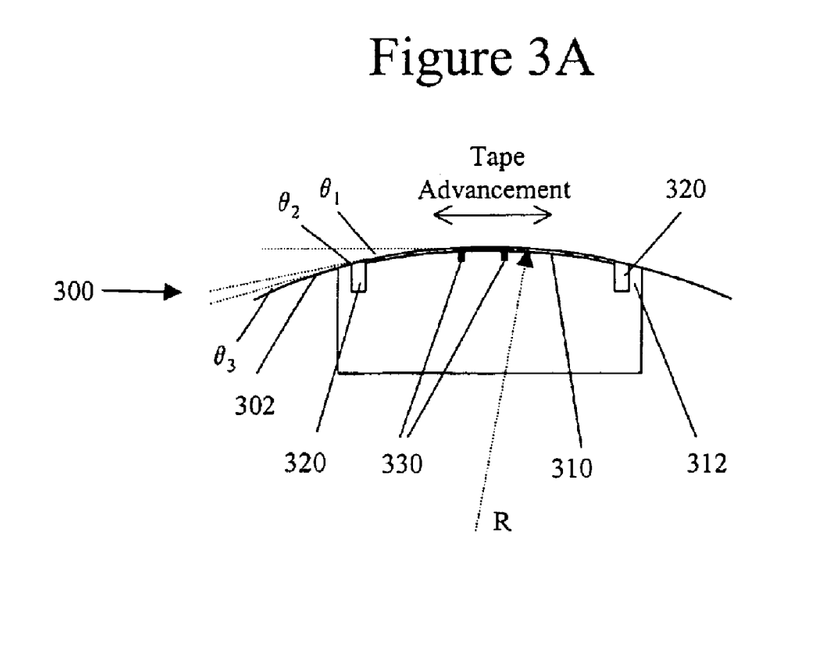
FIGS. 3A and 3B illustrate cross-sectional views of exemplary head structures.
Figure 3B:
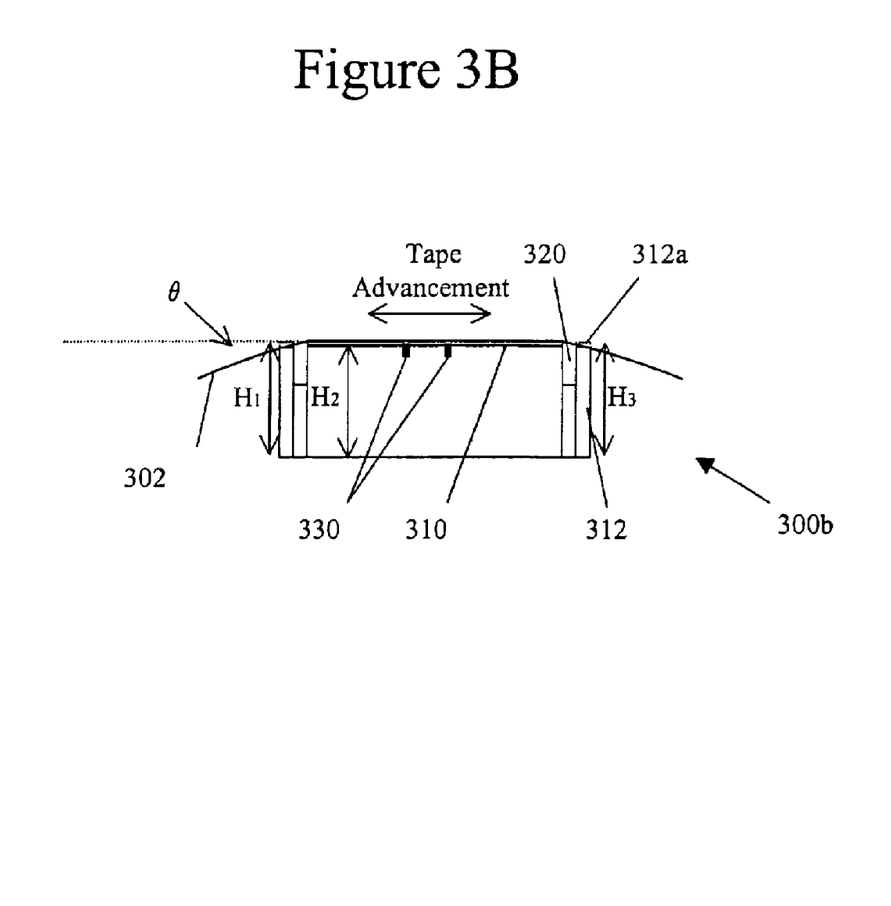

FIGS. 3A and 3B illustrate cross-sectional views of exemplary magnetic heads 300 and 300b. Specifically, FIG. 3A illustrates an exemplary head 300 with a contoured head. The support surface 310 of magnetic head 300 includes a curvature of high radius "R", i.e., having little curvature on the supporting surface 310. For example, the radius may between approximately 500 and 1,000 milli-inches. Tape 302 preferably streams across the magnetic head 300 as shown creating an angle $\theta_1$ with the center of magnetic head 300 and a wrap angle of $\theta_2$ between a tangent of the edge of major support surface 310 and tape 302 adjacent the edge of major support surface 310 (i.e., above slot 320). Read/write heads 330 are located on the magnetic head 300 to access the tape 350 as it streams across supporting surface 310.

Support surface 312 is located at the leading and trailing edges of magnetic head 300 and are separated from the supporting surface 310 by slot 320. Initially, supporting surfaces 312 may be at a greater height consistent with the radius of curvature R. Preferably, support surface 312 and slot 320 are formed in width with respect to the direction of tape-advancement such that as tape 302 is advanced, support surface 312 will wear down relative to supporting surface 310 and create a desired wrap angle $\theta_2$ between tape 302 and the major support surface 310. In one example, a lapping tape including more highly corrosive materials than typical tape, such as a conventional diamond lapping tape, chromium dioxide, and the like, may be used initially to wear down supporting surface 312 and create a desired wrap angle $\theta_2$.

In one example, wrap angle $\theta_2$ between tape 302 and the edge of the major support surface 310 is between approximately 1 and 2 degrees or less. Further, the angle $\theta_3$ between tape 302 and thin support 312 may be between 1 and 5 degrees depending on the particular application and design. It should be recognized that other wrap angles $\theta_2$ and angles $\theta_3$ are possible and contemplated.

FIG. 3B illustrates more clearly how the support surfaces will depress during conditioning or use to create a desired wrap angle. In this example, the support surface 310 of magnetic head 300b is flat, or includes a relatively high radius of curvature. Slot 320 may be formed near the perimeter or edge of magnetic head 300, such that support surfaces 312 include the outlined portion 312a which may be on all four sides of support surface 310 as illustrated in FIGS. 1A–1B. Initially, the height, or vertical distance towards tape 302 of support surfaces 312 and support surface 310 are manufactured to be the same or nearly the same height, i.e., coplanar with respect to each other such that $H_1=H_2=H_3$. During initial use, e.g., with a lapping tape or the like, wear on support surfaces 312 will be greater than support surface 310 because of the thinner width, higher wrap angle to the surface, and the like resulting in higher pressure and wear across support surfaces 312 until the height of support surface 312 depresses. The higher pressure and resulting wear on support surface 312 may cause a portion of the outlined region 312a to be removed or depressed by the tape creating the desired wrap angle to head 300b.

The depth of slot 312 may vary depending on the particular application and manufacturing methods. For example, the depth may be only deep enough to leave a slot or separation between supporting surface 310 and supporting surface 312 after a portion of supporting surface 312 has been worn away. To allow for increased air bleeding, however, the depth of slot 312 may be formed significantly deeper as well as extending through at least a portion of head 300b.

Figure 4:
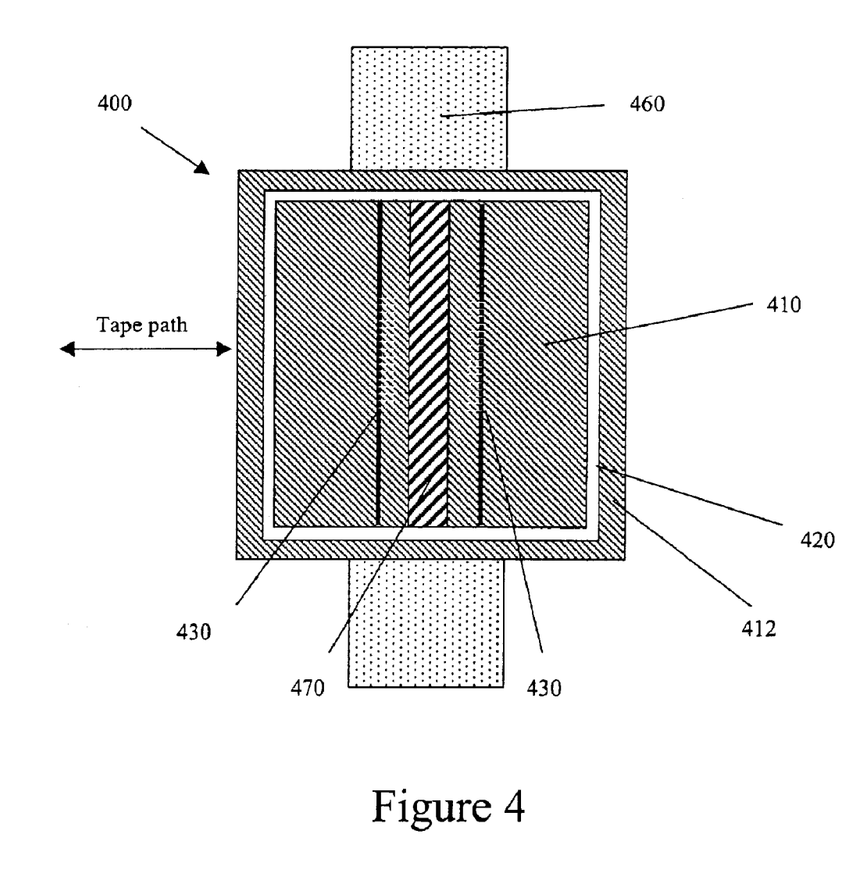
FIG. 4 illustrates a plan view of another exemplary head structure with additional support.

FIG. 4 illustrates another exemplary magnetic head 400 for use with a magnetic storage tape. In this example, magnetic head 400 includes a support surface 460 extending on either side of magnetic head 400 and transversely to the tape path. Support surface 460 may provide further support for a tape as it moves across magnetic head 400 including one or more active device regions 430. Support surface 460 is preferably at a height lower than the support surface 410 to allow a desired wrap angle of the tape with head 400 as the head 400 moves transversely to the tape path to align active devices with various data tracks on the tape.

Support surface 460 may also be used for compatibility with conventional tape drive systems that include heads that are as wide or wider than the tape. For example, an exemplary tape drive system that may include an exemplary head described herein (with or without support surface 460) is disclosed in U.S. Pat. No. 6,188,532, entitled "BACKWARD COMPATIBLE HEAD AND HEAD POSITIONING ASSEMBLY FOR A LINEAR DIGITAL TAPE DRIVE," and U.S. Pat. No. 6,369,982, entitled "FLOATING TAPE HEAD HAVING SIDE WINGS FOR LONGITUDINAL AND AZIMUTH PLAY BACK WITH MINIMIZED TAPE WRAP ANGLE," both of which are incorporated by reference herein in their entirety.

Further, in this example, a shield 470 is formed between two active device regions 430. Shield 470 may be suitably formed on head 400 between active device regions 430 to reduced noise cross feed, for example, noise from a set of write transducers and a set of read transducers or the like. Shield 470 may include copper or other suitable materials for reducing noise and other interference during operation. Shield 470 may be used with any shape head structure and configuration of slots and support surfaces.

An exemplary method of manufacturing a magnetic head includes removing a portion of the head to create a major surface and thin support surface as described above. Any suitable method may be used for removing a portion of the head structure to form the slot. For example, machining, laser ablation, dry or wet etches, plasma etch, and the like. Additionally, selective deposition of materials may create the major and thin support surfaces with a slot formed therebetween.

After the slot has been formed, a lapping tape may be used to condition the head structure and create the desired angle. As discussed above, the positioning and width of the slot may be adjusted depending on, for example, the materials, tape speed, and the like to create a predetermined or desired wrap angle. As the lapping tape is streamed across the head, the thin support surface will wear or depress more than the major surface to change the wrap angle of the tape with respect to the head structure.

The read/write transducers in the active device regions may be formed by any suitable methods. For example, conventional deposition and etching techniques and the like may be used. In one example, the head is formed with the active device region prior to having the slot formed therein as described above.

The above detailed description is provided to illustrate exemplary embodiments and is not intended to be limiting. It will be apparent to those skilled in the art that numerous modification and variations within the scope of the present invention are possible. For example, various support surface contours and slot widths may be used. Further, numerous other materials and processes not explicitly described herein may be used within the scope of the exemplary methods and structures described as will be recognized by those skilled in the art. Accordingly, the present invention is defined by the appended claims and should not be limited by the description herein.

What is claimed is:

1. A method for manufacturing a magnetic head for use with magnetic storage media, comprising:

removing a portion of a magnetic head support surface to create a slot transverse to a direction the media advances and at least partially separating a major support surface having an active device region and a thin support surface; and removing a portion of the thin support surface such that the height of at least a portion of the thin support surface is reduced relative to the major support surface.

2. The method of claim 1, further including removing a portion of the magnetic head support surface to create a slot parallel to the direction the media advances.

3. The method of claim 1, wherein the portion of the thin support surface is removed to create a desired wrap angle between the media and the major support surface.

4. The method of claim 1, wherein removing the portion of the thin support surface includes removal with a lapping tape.

5. The method of claim 1, wherein removing the portion of the thin support surface includes removal with use of the media.

6. The method of claim 1, wherein removing a portion of a magnetic head support surface includes machining.

7. The method of claim 1, wherein removing a portion of a magnetic head support surface includes laser ablation.

8. The method of claim 1, wherein the width of the slot is between approximately 3 to 5, milli-inches.

9. The method of claim 1, wherein the width of the thin support surface is between approximately 2 to 3 milli-inches.

10. The method of claim 1, wherein a ratio between the width of the slot measured along the direction the media advances and the thin support surface is between approximately 1 and 3.

11. The method of claim 1, wherein the thin support surface forms a perimeter around the major surface.

12. The method of claim 1, wherein the slot extends in a perimeter around the major surface.

* * * * *